US012220814B2

(12) United States Patent
Campolo et al.

(10) Patent No.: US 12,220,814 B2
(45) Date of Patent: Feb. 11, 2025

(54) MASTER-SLAVE ROBOT ARM CONTROL SYSTEM AND CONTROL METHOD

(71) Applicants: Delta Electronics Int'l (Singapore) Pte Ltd, Singapore (SG); Nanyang Technological University, Singapore (SG)

(72) Inventors: Domenico Campolo, Singapore (SG); Sreekanth Kana, Singapore (SG); Juhi Gurnani, Singapore (SG); Vishal Padmanabhan Ramanathan, Singapore (SG); Mohammad Zaidi Bin Ariffin, Singapore (SG); Sri Harsha Turlapati, Singapore (SG); Tzu-Yi Hung, Singapore (SG)

(73) Assignees: Delta Electronics Int'l (Singapore) Pte Ltd, Singapore (SG); Nanyang Technological University, Singapore (SG)

( * ) Notice: Subject to any disclaimer, the term of this patent is extended or adjusted under 35 U.S.C. 154(b) by 243 days.

(21) Appl. No.: 18/083,231

(22) Filed: Dec. 16, 2022

(65) Prior Publication Data
US 2024/0198509 A1    Jun. 20, 2024

(51) Int. Cl.
*B25J 3/00*    (2006.01)
*B25J 9/16*    (2006.01)

(52) U.S. Cl.
CPC .............. *B25J 3/00* (2013.01); *B25J 9/1605* (2013.01); *B25J 9/163* (2013.01); *B25J 9/1633* (2013.01); *B25J 9/1664* (2013.01); *B25J 9/1687* (2013.01)

(58) Field of Classification Search
CPC ... B25J 3/00; B25J 9/1605; B25J 9/163; B25J 9/1633; B25J 9/1664; B25J 9/1687; B25J 9/1689; B25J 13/00
(Continued)

(56) References Cited

U.S. PATENT DOCUMENTS 8,689,530 B2   4/2014   Prahm et al.
8,997,438 B1   4/2015   Fallas
(Continued)

FOREIGN PATENT DOCUMENTS

CN    104552300 A    2/2016
CN    108908298 A    11/2018
(Continued)

OTHER PUBLICATIONS

Schoettler, Gerrit et al., Meta-Reinforcement Learning for Robotic Industrial Insertion Tasks, arXiv: 2004.14404, May 23, 2020.
(Continued)

*Primary Examiner* — B M M Hannan
(74) *Attorney, Agent, or Firm* — KIRTON McCONKIE; Evan R. Witt

(57) ABSTRACT

The present disclosure provides a master-slave robot arm control system and method. The control method includes steps of: (a) providing a master and a slave robot arms; (b) executing a robot arm demonstration task, wherein the step (b) includes steps of: (b1) utilizing the slave robot arm to output a force feedback; (b2) generating an action command by operating the master robot arm; (b3) calculating and generating a movement command; (b4) controlling the slave robot arm to move and to generate a movement trajectory and the force feedback correspondingly; (c) repeating the step (b) to collect a plurality of movement trajectories of the slave robot arm; (d) utilizing a statistic module to analyze the plurality of movement trajectories; (e) generating an optimized trajectory of the slave robot arm; and (f) controlling the slave robot arm to execute a robot arm task.

10 Claims, 3 Drawing Sheets

(58) Field of Classification Search
USPC .......................................................... 700/245
See application file for complete search history.

(56) References Cited

U.S. PATENT DOCUMENTS

| | | |
|---|---|---|
| 9,789,983 B2 | 10/2017 | Brandhorst et al. |
| 9,809,333 B2 | 11/2017 | Minamino et al. |
| 10,329,042 B2 | 6/2019 | Nammoto et al. |
| 10,981,683 B2 | 4/2021 | Iwasa et al. |
| 2011/0005174 A1* | 1/2011 | Prahm ..................... B65B 5/061 |
| | | 901/50 |
| 2015/0013277 A1* | 1/2015 | Brandhorst ............. B65B 35/52 |
| | | 53/244 |
| 2016/0272354 A1* | 9/2016 | Nammoto .............. B25J 13/085 |
| 2023/0047358 A1* | 2/2023 | Balter .................... G09B 23/28 |

FOREIGN PATENT DOCUMENTS

| | | | | |
|---|---|---|---|---|
| CN | 106493708 B | * | 9/2019 | ............ B25J 13/025 |
| CN | 111409074 A | * | 7/2020 | |
| CN | 112372920 A | * | 2/2021 | ......... B29C 37/0067 |
| CN | 113412178 A | | 9/2021 | |
| CN | 114227688 A | | 3/2022 | |
| CN | 117379176 A | * | 1/2024 | |
| JP | 2019098520 A | * | 6/2019 | |
| WO | WO-2021158306 A1 | * | 8/2021 | ............. G09B 23/28 |

OTHER PUBLICATIONS

Dong, Siyuan et al., Tactile-Based Insertion for Dense Box-Packing, arXiv: 1909.05426, Sep. 12, 2019.

* cited by examiner

MASTER-SLAVE ROBOT ARM CONTROL SYSTEM AND CONTROL METHOD

FIELD OF THE INVENTION

The present disclosure relates to a master-slave robot arm control system and control method, and more particularly to a master-slave robot arm control system and control method with a haptic feedback from the slave robot side to the master robot.

BACKGROUND OF THE INVENTION

Regarding the conventional box-in-box insertion task, it is performed manually and relies on the haptics and touch-based operations by the operator. It is flexible while using manual operation to perform the box-in-box insertion task because the manual operation can handle the uncertainty of the environment, such as the position relationship between the boxes or differences in box material and box size. Furthermore, during the manual operation, the insertion angle or process may be adjusted at any time while the environment factors (e.g., encountering obstacles) change.

With the increase in the labor cost and the requirement to efficiency, the industrial robot technology is introduced to perform compliant box-in-box insertion task. The industrial robot is fast and accurate comparing to the manual operation, and the industrial robot is capable of doing repetitive tasks with low uncertainties. Existing technologies focus on introducing compliance on the robot side (say through soft grippers, suckers or adapters). To the inventors' knowledge, none of the existing works perform tight insertion of one compliant box into another without the aid of specifically designed gripper/adapters. In addition, unlike the rigid objects, for compliant objects modelling the contact states during the insertion process is challenging due to the object deformation. Hence pre-programming the robot motion for insertion is infeasible.

Therefore, there is a need of providing a master-slave robot arm control system and control method to obviate the drawbacks encountered from the prior arts.

SUMMARY OF THE INVENTION

It is an object of the present disclosure to provide a master-slave robot arm control system and control method. The control system controls the master and slave robot arms in tele-operation with haptic feedback and takes the force feedback into consideration simultaneously. Since the force feedback is taken into consideration, the accuracy of the robot arm task is improved when the environment changes. In addition, by learning the compliant box-in-box insertion through demonstration learning, learning from demonstration (LFD) is achieved.

In accordance with an aspect of the present disclosure, there is provided a master-slave robot arm control system. The master-slave robot arm control system includes a master robot arm, a slave robot arm and a control unit. The slave robot arm is in communication with the master robot arm, wherein the master robot arm is configured to control the slave robot arm, the slave robot arm generates and outputs a force feedback to the master robot arm constantly, wherein the force feedback reflects the force received by the slave robot arm during movement process. The control unit is configured to control the master robot arm and the slave robot arm. When the control unit executes a robot arm demonstration task, the master robot arm is operated to generate an action command according to a user command and the force feedback, the control unit calculates and generates a movement command according to the action command and the force feedback, the control unit controls the slave robot arm to move according to the movement command and to generate a movement trajectory and the force feedback correspondingly. The control unit executes the robot arm demonstration task for a plurality of times to collect a plurality of movement trajectories of the slave robot arm. The control unit utilizes a statistic module to analyze the plurality of movement trajectories and to generate an optimized trajectory of the slave robot arm according to the analysis result. The control unit controls the slave robot arm to execute a robot arm task according to the optimized trajectory.

In accordance with an aspect of the present disclosure, there is provided a master-slave robot arm control method including steps of: (a) providing a master robot arm and a slave robot arm in communication with each other, wherein the master robot arm is configured to control the slave robot arm; (b) executing a robot arm demonstration task, wherein the step (b) includes steps of: (b1) utilizing the slave robot arm to generate and output a force feedback to the master robot arm constantly, wherein the force feedback reflects the force received by the slave robot arm during movement process; (b2) generating an action command by operating the master robot arm according to a user command and the force feedback; (b3) calculating and generating a movement command according to the action command and the force feedback; (b4) controlling the slave robot arm to move according to the movement command and to generate a movement trajectory and the force feedback correspondingly; and (b5) executing the steps (b1) to (b4) repeatedly until the robot arm demonstration task is finished; (c) repeating the step (b) to collect a plurality of movement trajectories of the slave robot arm; (d) utilizing a statistic module to analyze the plurality of movement trajectories; (e) generating an optimized trajectory of the slave robot arm according to the analysis result of the step (d); and (f) controlling the slave robot arm to execute a robot arm task according to the optimized trajectory.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
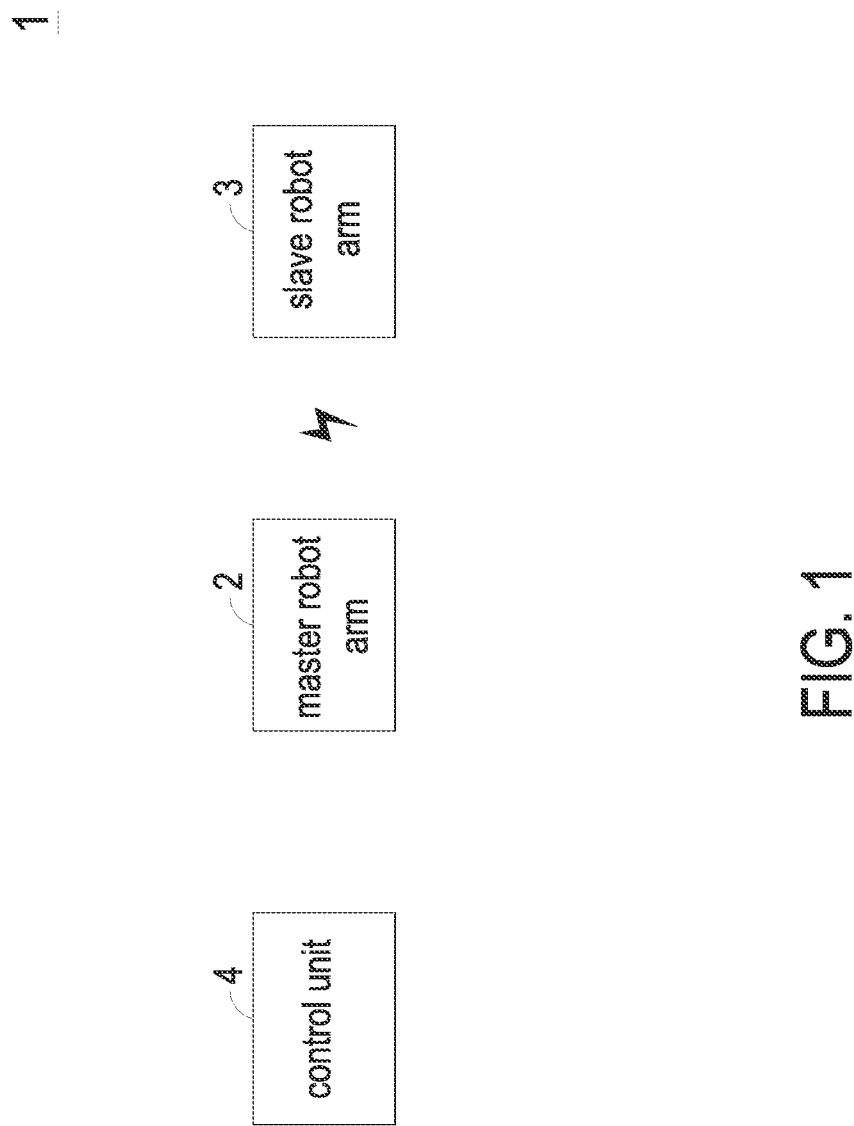
FIG. 1 is a schematic system diagram illustrating a master-slave robot arm control system according to an embodiment of the present disclosure.

FIG. 1 is a schematic system diagram illustrating a master-slave robot arm control system 1 according to an embodiment of the present disclosure. As shown in FIG. 1, the master-slave robot arm control system 1 includes a master robot arm 2, a slave robot arm 3 and a control unit 4. The slave robot arm 3 is in communication with the master robot arm 2, and the master robot arm 2 is configured to control the slave robot arm 3. Therefore, the master robot arm 2 and the slave robot arm 3 are in tele-operation, and the slave robot arm 3 is controlled by the master robot arm 2 to perform remote tasks. In an embodiment, the movement trajectory of the slave robot arm 3 and the master robot arm 2 are synchronized, that is, the movement of the slave robot arm 3 is followed by the movement of the master robot arm 2. The slave robot arm 3 generates and outputs a force feedback to the master robot arm 2 constantly, the force feedback reflects the forces received by the slave robot arm 3 during movement process. The control unit 4 is configured to control the master robot arm 2 and the slave robot arm 3. When the control unit 4 executes a robot arm demonstration task, a user operates the master robot arm 2 to generate an action command according to a user command and the force feedback generated by the slave robot arm 3. By executing the robot arm demonstration task through demonstration learning, learning from demonstration (LFD) is achieved. The action command corresponds to the movement trajectory of the master robot arm 2. Since the slave robot arm 3 and the master robot arm 2 are synchronized, the movement trajectory of the slave robot arm 3 is the same as the movement trajectory of the master robot arm 2 during the robot arm demonstration task. In addition, during the movement process of the slave robot arm 3, the slave robot arm 3 receives the forces and outputs the corresponding force feedback to the master robot arm 2 constantly, so the master robot arm 2 is aware of the force received by the slave robot arm 3 instantly. In an embodiment, the action command is generated through operating the grippers of the master robot arm 2 manually by the user. In an embodiment, the user command is instructed by the user.

The control unit 4 calculates and generates a movement command according to the action command and the force feedback. In an embodiment, the movement command includes a target coordinate. The control unit 4 controls the slave robot arm 3 to move according to the movement command and to generate a movement trajectory and the force feedback correspondingly. During the robot arm demonstration task, the slave robot arm 3 outputs the force feedback constantly, so the user may adjust the operation of the master robot arm 2 accordingly. For example, when the slave robot arm 3 encounters an obstacle during the movement process, the force feedback corresponding to encountered obstacle is generated and outputted to the master robot arm 2, and the user can adjust the operation such as adjusting the trajectory of the master robot arm 2 manually so as to avoid the obstacle.

The control unit 4 executes the robot arm demonstration task for a plurality of times to collect a plurality of movement trajectories of the slave robot arm 3. The control unit 4 utilizes a statistic module to analyze the plurality of movement trajectories and to generate an optimized trajectory of the slave robot arm 3 according to the analysis result. In an embodiment, the statistic module includes Gaussian mixture regression or Gaussian mixture model.

After the optimized trajectory of the slave robot arm 3 is obtained, the control unit 4 controls the slave robot arm 3 to execute a robot arm task according to the optimized trajectory. In an embodiment, the robot arm task is the same as robot arm demonstration task.

In the master-slave robot arm control system 1 of the present disclosure, the control system 1 controls the master and slave robot arms in tele-operation and takes the force feedback into consideration simultaneously. Since the force feedback is taken into consideration, the accuracy of the robot arm task is improved when the environment changes.

In an embodiment, an impedance control with the force feedback includes a gravity compensation value, wherein the gravity compensation value reflects the gravity force received by the slave robot arm 3 during movement process.

In an embodiment, the robot arm demonstration task includes at least one of picking a first compliant box, placing the first compliant box near a second compliant box, inserting the first compliant box into the second compliant box and retracting the first compliant box from the second compliant box. In an embodiment, while inserting the first compliant box into the second compliant box, the first compliant box is inserted into the second compliant box along an edge of the opening of the second compliant box, so as to improve the accuracy of inserting the first compliant box into the second compliant box.

In an embodiment, the position relationship between the first compliant box and the second compliant box is not limited. The robot arm demonstration tasks may be executed for a plurality of times with different position relationship between the first compliant box and the second compliant box. The plurality of movement trajectories of the slave robot arm 3 with different position relationship between the first compliant box and the second compliant box are obtained so as to generate a plurality of optimized trajectories corresponding to different position relationships respectively. The control unit 4 controls the slave robot arm 3 to execute a robot arm task according to the optimized trajectories. In an embodiment, the robot arm task is the same as one of the robot arm demonstration tasks.

Figure 2:
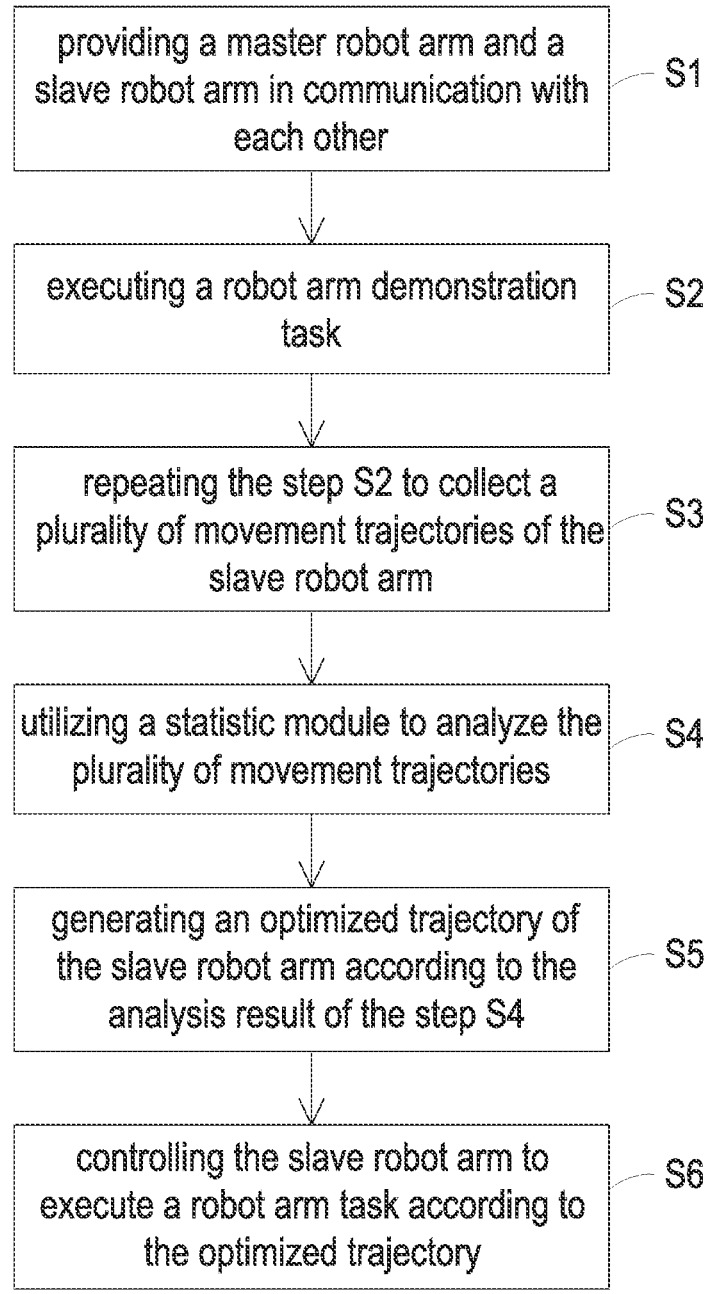
FIG. 2 is a schematic flow chart illustrating a master-slave robot arm control method according to an embodiment of the present disclosure.
Figure 3:
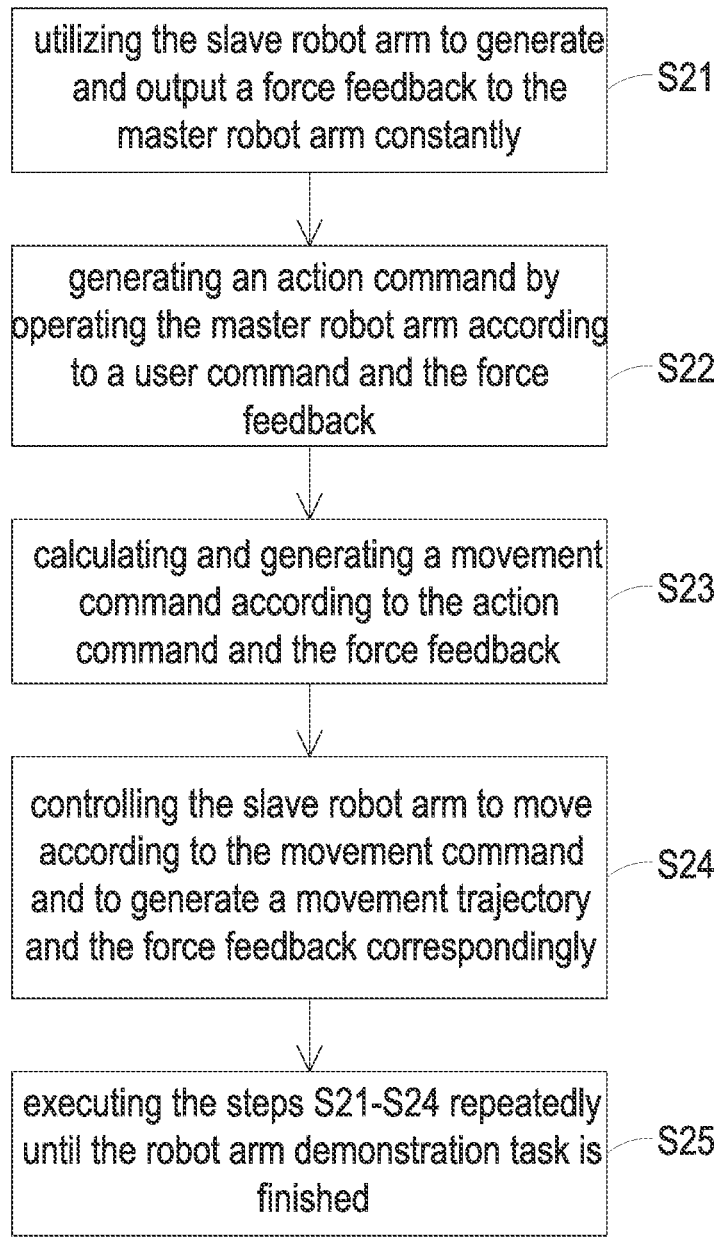
FIG. 3 is a schematic flow chart illustrating the step S2 of the master-slave robot arm control method of FIG. 2.

FIG. 2 is a schematic flow chart illustrating a master-slave robot arm control method according to an embodiment of the present disclosure. FIG. 3 is a schematic flow chart illustrating the step S2 of the master-slave robot arm control method of FIG. 2. The master-slave robot arm control method of the present disclosure is applicable for the master-slave robot arm control system 1 stated above. Please refer to FIGS. 2 and 3, the master-slave robot arm control method of the present disclosure includes steps S1, S2, S3, S4, S5 and S6. In the step S1, a master robot arm 2 and a slave robot arm 3 in communication with each other are provided, wherein the master robot arm 2 is configured to control the slave robot arm 3. In the step S2, a robot arm demonstration task is executed, wherein the step S2 includes steps S21, S22, S23, S24 and S25. In the step S21, the slave robot arm 3 is utilized to generate and output a force feedback to the master robot arm 2 constantly, wherein the force feedback reflects the force received by the slave robot arm 3 during movement process. In the step S22, an action command is generated by operating the master robot arm 2 according to a user command and the force feedback. The master robot arm 2 can be operated by an user. In the step S23, a movement command is calculated and generated according to the action command and the force feedback. In the step S24, the slave robot arm 3 is controlled to move according to the movement command and to generate a movement trajectory and the force feedback correspondingly. In the step S25, the steps S21 to S24 are executed repeatedly until the robot arm demonstration task is finished. In the step S3, the step S2 is performed repeatedly to collect a plurality of movement trajectories of the slave robot arm 3. In the step S4, a statistic module is utilized to analyze the plurality of movement trajectories. In the step S5, an optimized trajectory of the slave robot arm 3 is generated according to the analysis result of the step S4. In the step S6, the slave robot arm 3 is controlled to execute a robot arm task according to the optimized trajectory.

In an embodiment, the robot arm demonstration task includes at least one of picking a first compliant box, placing the first compliant box near a second compliant box, inserting the first compliant box into the second compliant box and retracting the first compliant box from the second compliant box.

From the above descriptions, the present disclosure provides a master-slave robot arm control system and control method. The control system controls the master and slave robot arms in tele-operation and takes the force feedback into consideration simultaneously. Since the force feedback is taken into consideration, the accuracy of the robot arm task is improved when the environment changes.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A master-slave robot arm control method comprising steps of:
   (a) providing a master robot arm and a slave robot arm in communication with each other, wherein the master robot arm is configured to control the slave robot arm;
   (b) executing a robot arm demonstration task, wherein the step (b) comprises steps of:
      (b1) utilizing the slave robot arm to generate and output a force feedback to the master robot arm constantly, wherein the force feedback reflects the force received by the slave robot arm during movement process;
      (b2) generating an action command by operating the master robot arm according to a user command and the force feedback;
      (b3) calculating and generating a movement command according to the action command and the force feedback;
      (b4) controlling the slave robot arm to move according to the movement command and to generate a movement trajectory and the force feedback correspondingly; and
      (b5) executing the steps (b1) to (b4) repeatedly until the robot arm demonstration task is finished;
   (c) repeating the step (b) to collect a plurality of movement trajectories of the slave robot arm;
   (d) utilizing a statistic module to analyze the plurality of movement trajectories;
   (e) generating an optimized trajectory of the slave robot arm according to the analysis result of the step (d); and
   (f) controlling the slave robot arm to execute a robot arm task according to the optimized trajectory.

2. The control method according to claim 1, wherein in the step (d), the statistic module comprises Gaussian mixture regression or Gaussian mixture model.

3. The control method according to claim 1, wherein in the step (b), the robot arm demonstration task comprises at least one of picking a compliant first compliant box, placing the first compliant box near a second compliant box, inserting the first compliant box into the second compliant box and retracting the first compliant box from the second compliant box.

4. The control method according to claim 3, wherein while inserting the first compliant box into the second compliant box, the first compliant box is inserted into the second box along an edge of an opening of the second box.

5. The control method according to claim 1, wherein an impedance control with the force feedback comprises a gravity compensation value, wherein the gravity compensation value reflects the gravity force received by the slave robot arm during movement process.

6. A master-slave robot arm control system, comprising:
   a master robot arm;
   a slave robot arm in communication with the master robot arm, wherein the master robot arm is configured to control the slave robot arm, and the slave robot arm generates and outputs a force feedback to the master robot arm constantly, wherein the force feedback reflects the force received by the slave robot arm during movement process; and
   a control unit configured to control the master robot arm and the slave robot arm,
   wherein when the control unit executes a robot arm demonstration task, the master robot arm is operated to generate an action command according to a user command and the force feedback, the control unit calculates and generates a movement command according to the action command and the force feedback, the control unit controls the slave robot arm to move according to the movement command and to generate t trajectory and the force feedback correspondingly,
   wherein the control unit executes the robot arm demonstration task for a plurality of times to collect a plurality of movement trajectories of the slave robot arm,
   wherein the control unit utilizes a statistic module to analyze the plurality of movement trajectories and to generate an optimized trajectory of the slave robot arm according to the analysis result,
   wherein the control unit controls the slave robot arm to execute a robot arm task according to the optimized trajectory.

7. The master-slave robot arm control system according to claim 6, wherein the statistic module comprises Gaussian mixture regression or Gaussian mixture model.

8. The master-slave robot arm control system according to claim 6, wherein the robot arm demonstration task comprises at least one of picking a first compliant box, placing the first compliant box near a second compliant box, inserting the first compliant box into the second compliant box and retracting the first compliant box from the second compliant box.

9. The master-slave robot arm control system according to claim 8, wherein while inserting the first compliant box into the second complaint box, the first compliant box is inserted into the second compliant box along an edge of an opening of the second box.

10. The master-slave robot arm control system according to claim 6, wherein an impedance control with the force feedback comprises a gravity compensation value, wherein the gravity compensation value reflects the gravity force received by the slave robot arm during movement process.

* * * * *